Jan. 9, 1951 — E. F. ROSSMAN — 2,537,424
SHOCK ABSORBER
Filed Aug. 13, 1947
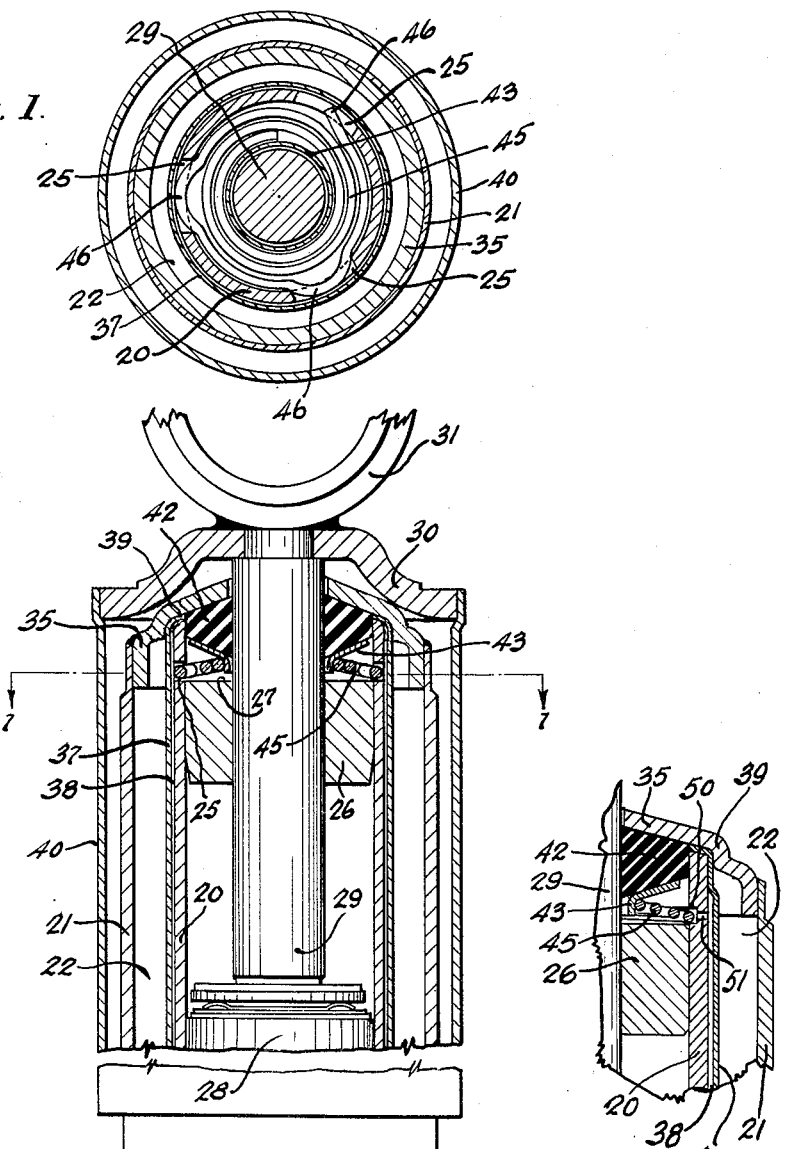
Fig. 1.
Fig. 2.
Fig. 3.
INVENTOR.
EDWIN F. ROSSMAN
BY
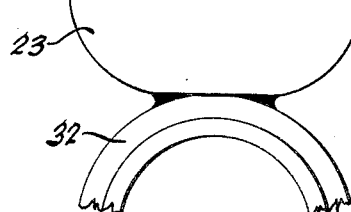
HIS ATTORNEYS.

Patented Jan. 9, 1951

2,537,424

UNITED STATES PATENT OFFICE 2,537,424

SHOCK ABSORBER

Edwin F. Rossman, Dayton, Ohio, assignor to General Motors Corporation, Detroit, Mich., a corporation of Delaware Application August 13, 1947, Serial No. 768,299

1 Claim. (Cl. 188—88)

This invention relates to improvements in direct acting, hydraulic shock absorbers.

It is among the objects of the present invention to provide a direct acting hydraulic shock absorber of simplified design and structure in which certain parts have been eliminated and other parts so designed as to perform their own as well as the functions of the eliminated parts.

A further object of the present invention is to provide a direct acting shock absorber in which certain parts are so designed as to hold other parts thereof rigidly concentric.

Further objects and advantages of the present invention will be apparent from the following description, reference being had to the accompanying drawings, wherein a preferred form of embodiment of the present invention is clearly shown.

In the drawings:

Fig. 1 is a transverse sectional view taken on the line 1—1 of Fig. 2.

Fig. 2 is a part longitudinal sectional view of a direct acting hydraulic shock absorber constructed in accordance with the present invention.

Fig. 3 is a fragmentary sectional view illustrating a modified form of construction.

Referring to the drawings the hydraulic shock absorber comprises two concentrically arranged tubular members 20 and 21. The inner and smaller tubular member 20 provides the working cylinder of the shock absorber, while the larger tubular member 21 surrounding said cylinder forms the fluid containing reservoir 22 around said cylinder. Both tubular members 20 and 21 are supported by the closure member 23, the tubular member 21 being attached thereto in any suitable manner as for instance by welding. The interior of the cylinder 20 has its bottom end in communication with the reservoir 22 there being any suitable fluid flow control mechanism provided between the cylinder and reservoir for controlling the transfer of fluid flow therebetween. This mechanism may be of any suitable standard design and because it forms no featured part of the present invention is not illustrated.

As illustrated in Figs. 1 and 2, an annular row of elongated slots 25 are provided in the wall of the cylinder adjacent the end thereof opposite the closure member 23.

A plug 26 having a central aperture is press-fitted within the cylinder so that its upper or outer surface 27 is substantially flush with the inner edges of the openings or slots 25 in the cylinder wall. A piston 28 of any suitable design and provided with any suitable fluid flow control devices for controlling the flow of fluid through the piston in one direction or the other, is provided in the cylinder, said piston having a rod 29 attached thereto which extends through and is slidably supported in the aperture in plug 26. The outer end of said rod has an annular cup-shaped disc 30 and a mounting ring 31 attached thereto. Mounting ring 31 is provided to attach the movable portion including the piston of the shock absorber to one of the elements whose movements the shock absorber is to control, while a similar mounting ring 32 is attached to the closure member 33 providing for the attachment of the other relatively movable portion of the shock absorber including tubes 20 and 21 to the other member whose movement the shock absorber is adapted to control.

A cover cap 35 is telescopically received by the tubular member 21 and is attached thereto in any suitable manner either by screwing thereto or being welded thereto. This cap has a central aperture through which the piston rod 29 extends.

A tubular member 37 slightly larger in diameter than the outside diameter of the cylinder 20 so as to form a narrow annular space 38 between said cylinder and tubular member extends downwardly into the reservoir so that its end is beneath the normal level in the fluid of the reservoir 22. The upper end of said tubular member 37 has an inwardly extending annular flange 39 which rests upon the upper end of the cylinder 20 as shown in Fig. 2. When the cap 35 is inserted in the tubular member 21, is engages the inwardly extending annular flange 39 of the tubular member 37 and presses it into clamping engagement upon the end of the cylinder 20 thus this cap 35 clamps and holds the cylinder 20 in proper position relatively to the outer tubular member 21 and in seating engagement with the closure member 23.

Another tubular member 40 fits about the disc 30 and is attached thereto by welding, this tube 40 surrounding the tubular member 21 and forming a stone guard to protect said tubular member.

In the space between the cover cap 35 and the plug 26 there is provided a packing gland 42 preferably made of any suitable resilient material, this gland surrounding and snugly gripping the peripheral surface of the piston rod 29. A ring-shaped abutment plate 43 engages the one surface of the packing gland 42, the opposite surface engaging the inside of the cover cap 35. Interposed between the abutment plate 43 on the packing gland 42 and the plug 26 there is a coil spring 45, the one end convolution engaging said abutment plate 43, the other end convolution engaging the plug 26 and having portions 46 which enter and seat within the openings 25 in the wall of cylinder 20. This spring exerts a pressure upon the resilient packing gland 42 to urge its annular surface into sealing engagement with the piston rod and to urge its outer surfaces into sealing engagement with the inside of the cover cap 35 and an annular portion of the inner cylinder wall adjacent its end. By the force of the spring 45, this gland is also urged into sealing engagement with that portion of the inwardly extending flange 39 of the tubular member 37 to seal this joint against any fluid leaks. The portions 46 of the one end convolution of spring 45 forms abutment sections against which the plug 26 abuts thus preventing said plug 26 from moving outwardly in the cylinder.

Any fluid leaking from the chamber between piston 28 and plug 26 through the sliding joint between the piston rod 29 and the aperture in the plug 26 enters the chamber in which spring 45 is located then passes through openings or slots 25 into the annular space 38, between tube 37 and cylinder 20 passing through this passage 38 to the fluid within the reservoir 22. Any air in this fluid passes through annular passage 38 into the fluid into the reservoir beneath its level and then rises in the reservoir 22 to the space above the fluid level in the reservoir where said air is trapped.

In Fig. 3, the cylinder 20 is provided with an annular groove 50 in its inner wall. The end convolution of spring 45 snaps into this groove 50 like any well known snap ring and thus locks said spring in position. This spring also acts as an abutment in this instance preventing outward movement of the plug 26 in the cylinder. To connect the space or chamber in which the packing 42 is located, with the reservoir 22, holes 51 may be provided in the grooved wall of the cylinder.

From the aforegoing it may be seen that the design of the shock absorber has been simplified and the spring 45 whose normal function is to exert a pressure upon the packing gland 42 to urge it into sealing engagement with various surfaces which it contacts also forms a locking member preventing outward movement of the plug 26 in cylinder 20.

While the embodiment of the present invention as herein disclosed, constitutes a preferred form, it is to be understood that other forms might be adopted, all coming within the scope of the claim which follows.

What is claimed is as follows:

A hydraulic shock absorber comprising in combination two concentric tubular members, the inner one forming a working cylinder, the outer one a fluid reservoir; a piston rod guide in said cylinder; a cover cap secured to the outer tubular member and providing a cover for the one end of the cylinder and forming a space above the rod guide; a piston in the cylinder, said piston having a rod extending through the rod guide and the cover cap; slots in the wall of the cylinder adjacent the outer surface of the rod guide, said slots providing communication between the said space and the reservoir; a packing in the said space, engaging surfaces of the rod, the cap and the interior of the cylinder; and a spring engaging the packing and having portions seating in the slots for supporting the spring and providing positive abutments for the rod guide to prevent its outward movement in the cylinder.

EDWIN F. ROSSMAN.

REFERENCES CITED

The following references are of record in the file of this patent:

UNITED STATES PATENTS

| Number | Name | Date |
|---|---|---|
| 1,616,540 | Morgan | Feb. 8, 1927 |
| 2,111,192 | Padgett | Mar. 15, 1938 |
| 2,155,978 | Oberstadt | Apr. 25, 1939 |
| 2,240,644 | Focht | May 6, 1941 |
| 2,276,406 | Magrum | Mar. 17, 1942 |
| 2,401,379 | Smith | June 4, 1946 |

FOREIGN PATENTS

| Number | Country | Date |
|---|---|---|
| 101,401 | Australia | June 21, 1937 |